United States Patent [19]

Das et al.

[11] 4,435,803
[45] Mar. 6, 1984

[54] ANALOG SUBSCRIBER/TRUNK MODULE WITH SHARED RINGING SOURCE AND RING-TRIP

[75] Inventors: Santanu Das, Huntington; Ramon C. W. Chea, Jr., Monroe; Russ C. Casterline, Trumbul, all of Conn.

[73] Assignee: International Telephone and Telegraph Corporation, New York, N.Y.

[21] Appl. No.: 322,606

[22] Filed: Nov. 18, 1981

Related U.S. Application Data

[63] Continuation of Ser. No. 135,756, Mar. 31, 1980, abandoned.

[51] Int. Cl.³ .................... H04J 3/12; H04M 19/02; H04Q 1/22
[52] U.S. Cl. .................................. 370/16; 370/110.1
[58] Field of Search ............ 179/18 HB, 18 J, 51 AA, 179/17 E, 84 R, 84 A; 370/110.1, 110.2, 16

[56] References Cited

U.S. PATENT DOCUMENTS

| | | | |
|---|---|---|---|
| 3,978,292 | 8/1976 | Hill et al. | 179/18 HB |
| 4,037,117 | 7/1977 | Carbrey | 307/252 N |
| 4,071,700 | 1/1978 | Huffman et al. | 370/16 |
| 4,075,430 | 2/1978 | Reines | 179/18 J |
| 4,160,127 | 7/1979 | Slana et al. | 370/16 |
| 4,161,633 | 7/1979 | Treiber | 179/170.2 |
| 4,282,410 | 8/1981 | Gauthier et al. | 179/84 R |
| 4,310,728 | 1/1982 | Dumont | 179/18 HB |
| 4,341,928 | 7/1982 | Stanson et al. | 179/51 AA |
| 4,354,264 | 10/1982 | Wurst | 370/110.1 |

Primary Examiner—Thomas W. Brown
Attorney, Agent, or Firm—John T. O'Halloran; Jeffery P. Morris

[57] ABSTRACT

An apparatus and method of organizing line interface modules between analog subscriber lines/trunks and a digital switch with the provision for ringing signals which may be shared by a plurality of lines from a single source is described. The ringing signals are intercoupled to any line or lines and transmitted through a common metallic bus which provides immediate ringing for any line, with a shared ring-trip circuit. A software-controlled and/or programmable signal generator in combination with a novel ring-trip circuit is described wherein ringing cadence is generated by connecting the programmable signal generator to a subscriber line for the proper duration and at any desired frequency, whereby multi-frequency ringing can be accomplished under programmable control. A spare line control function within a cluster of telecommunications line circuits is provided such that any telecommunications line circuit can arbitrarily be designated as a spare line, usable to provide temporary service, for example, to a telephone subscriber having a defective line, thereby permitting scheduled maintenance rather than on-demand maintenance. Immediate ringing is provided to groups of analog telephone lines having shared ringing sources and shared ring-trip circuits in a system architecture compatible with a digital switching system.

21 Claims, 10 Drawing Figures

4 ∅ U.S. RINGING

ANALOG SUBSCRIBER/TRUNK MODULE WITH SHARED RINGING SOURCE AND RING-TRIP

CROSS REFERENCE TO RELATED APPLICATION

This is a continuation, of application Ser. No. 135,756, filed Mar. 31, 1980, abandoned.

Reference is made to application Ser. No. 135,755, Programmable Ring Signal Generator, now U.S. Pat. No. 4,349,703, filed on even date herewith and assigned to the same assignee as is in the instant application. The present application is a continuation of application Ser. No. 135,756, now abandoned.

BACKGROUND OF THE INVENTION

1. Field of the Invention

The present invention relates to digital telecommunications systems having shared ring circuitry for groups of analog telecommunications lines interconnected through digital switching systems.

2. Description of the Prior Art

In telephone switching systems of the prior art, ringing has been provided from service circuits; i.e., ringing trunk lines such that at any given instant in time only one analog subscriber line may be rung from one such ringing circuit. Thus, a ring-trip circuit must be provided for each such prior art ringing circuit. When a requirement exists for immediate ringing, then the service circuit has had two sources of ringing connected thereto. One source being continuous and the other being phased. Such service circuit has included control which connects the analog subscriber line to be rung to the continuous ringing source for a predetermined time duration, such as 300 milliseconds, and then to the phased ringing source. Such prior art technique and similar known prior art ringing techniques require for multi-frequency ringing either different service circuits or the service circuits having the capability of providing any type or ringing. Such requirement involves the busing of different frequency sources and the inclusion of a plurality of relays or switches for each service circuit. The aforementioned ringing schemes of the prior art are unsuitable for use in digital switching systems, since ringing signals cannot be transmitted through the digital network.

Examples of such prior art telephone ringing systems may be had with reference to U.S. Pat. No. 3,767,857 relating to distributed immediate ringing circuits for a telephone system. U.S. Pat. No. 3,678,208 relating to immediate ringing by use of junctors assigned to different time slots of the ringing cycle. U.S. Pat. No. 4,075,430 (assigned to the assignee of the present invention) relating to line signaling over common highway for telecommunications systems. U.S. Pat. No. 3,005,053 relating to telephone signaling systems applying different signaling frequencies in different time slots. U.S. Pat. No. 3,085,133 relating to automatically controlled ringing with the provision of a ring immediately after connection, then ringing in accordance with the regular ringing cycle; and U.S. Pat. No. 3,118,019 relating to the connection of a ringing source to the desired telephone subscriber through a pair of gates in series, which must both switch in phase to permit the ringing signal to reach the subscriber. Digital telephone line circuits of the type contemplated to be employed with the present invention and which contain programmable signal generators having the capability of digitally generating ac and dc signaling voltages are available as exemplified, for example, by U.S. Pat. No. 4,161,633 of R. Treiber and assigned to the assignee of present invention; and reference may be made to U.S. Pat. No. 4,161,633 for details of the implementation of programmable signal generation in a digital telephone line circuit. Digital telecommunications switching systems of the type with which the present invention is particularly advantageously employed are described in detail by U.S. Pat. No. 4,201,889 issued May 6, 1980 of A. J. Lawrence, et al and assigned to the assignee of the present invention and references may be made to said Lawrence patent for details of such digital switching system.

SUMMARY OF THE INVENTION

The present invention provides an apparatus and method of organizing line interface modules between analog subscriber lines/trunks and a digital switch with the provision for ringing signals which may be shared by a plurality of lines from a single source. The ringing signals are intercoupled to any line or lines and transmitted through a common metallic bus which provides immediate ringing for any line, with a shared ring-trip circuit. A software-controlled and/or programmable signal generator in combination with a novel ring-trip circuit is described wherein ringing cadence is generated by connecting the programmable signal generator to a subscriber line for the proper duration and at any desired frequency, whereby multi-frequency ringing can be accomplished under programmable control.

It is also an object of the present invention to provide a spare line control function within a cluster of telecommunications line circuits such that any telecommunications line circuit can arbitrarily be designated as a spare line. Such spare line is usable to provide temporary service, for example, to a telephone subscriber having a defective line, thereby permitting scheduled maintenance rather than on-demand maintenance.

Another object of the present invention is the provision of an interface to groups of analog telecommunications lines such that ringing sources are shared by one or more groups of lines.

A further object of the present invention is the provision of immediate ringing to groups of analog telephone lines having shared ring-trip circuits in a system architecture compatible with a digital switching system.

A further object of the present invention is the provision of dry-switched (i.e., switching only when no current flows) operation of ring-relay in the line circuit to allow the usage of smaller and less expensive relay contacts by eliminating inductive interference normally associated with ringing current interruption.

DESCRIPTION OF THE PREFERRED EMBODIMENT

Referring now to the figures, a modular ringing distribution interface is illustrated to provide immediate ringing to groups of analog telephone lines interconnected by a digital switching system, with the ringing source being shared by groups of the telephone lines through a common metallic bus. The arrangement of FIG. 2, as will be described, permits more than one called subscriber to have a ringing signal coupled thereto per phase of the ringing signal, with a common supervision circuit, rather than the single phase per subscriber answering ringing of the prior art. In accordance with the present invention, a second subscriber can be rung immediately, without waiting for the next phase of the ringing signal. Immediate ringing may be defined as causing a ringing signal to be coupled to a designated subscriber line as soon as the controller or processor controlling the distribution of ringing signals gets a command to cause the designated subscriber line to ring.

Figure 1:
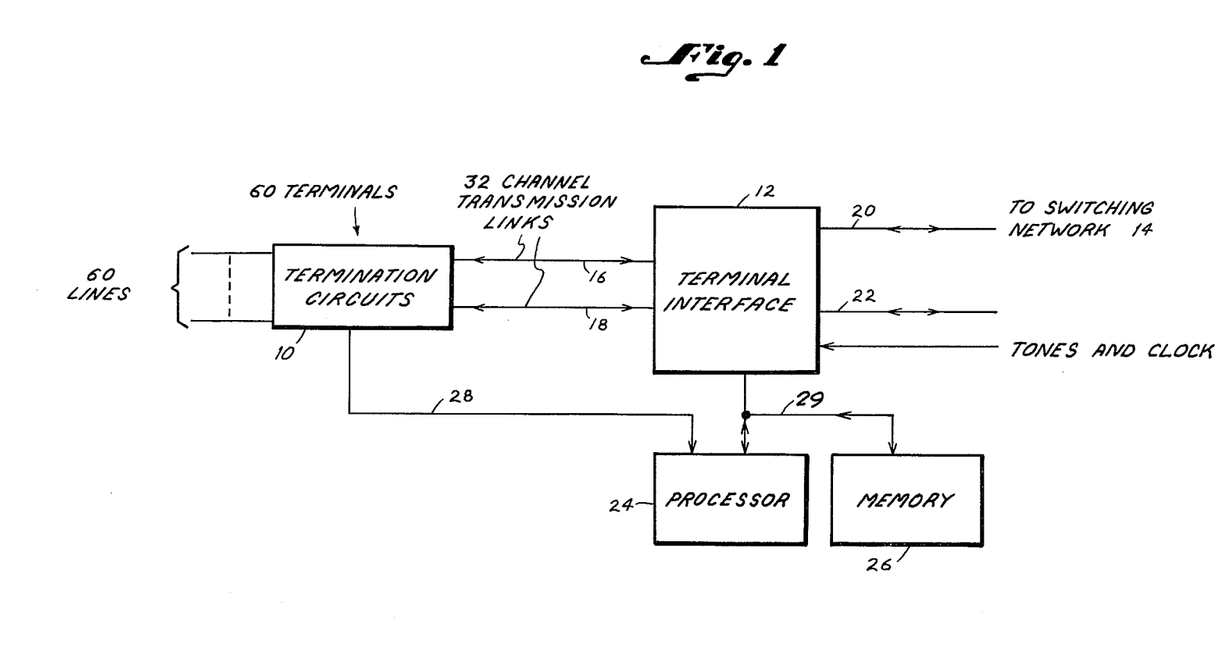
FIG. 1 is a simplified block diagram of a modular analog interface incorporating the present invention.
Figure 8:
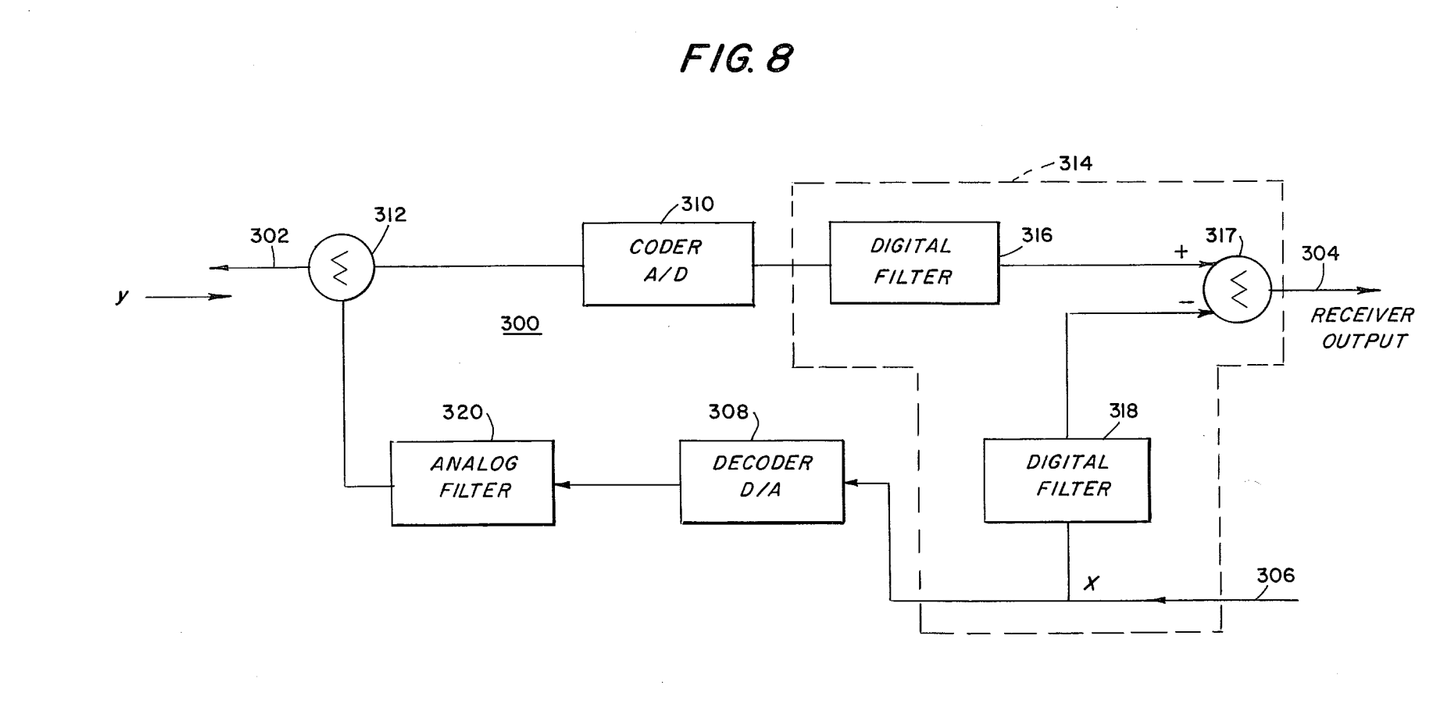
FIG. 8 illustrates an example of a subscriber line circuit of the prior art.

Referring to FIG. 1, a simplified block diagram illustrates a typical line cluster of 60 subscriber line terminals coupled to a digital switching matrix via a terminal interface incorporating the present invention. The interface between the analog line termination circuits 10, and the digital telephone switching network is provided by the terminal interface circuitry 12. The microprocessor 24, which performs the repetitive I/O functions, also uses the terminal interface circuitry 12 to communicate with other microprocessors in the system. The termination circuits 10 provide an interface incorporating a programmable power supply for interfacing analog subscriber lines and trunks of the telephone system of a telephone exchange with all A/D and D/A conversion and two-wire to four-wire conversion. The termination circuit also includes access switches for application of ringing voltage and other tones for measuring, testing and line monitoring, thereby enabling efficient central office operation. Continuous feedback under hardwired or microprocessor control for a programmable signal generator is utilized to derive control signals in response to monitored load changes on the subscriber ring and tip lines. Speech signal isolation may be achieved under microprocessor of hard-wired control by circuit control filtering the unwanted returns from the speech path; the dc power to feed the hand set may be generated without common audio impedance. A subscriber line termination circuit in accordance with the foregoing may be of the type described by U.S. Pat. No. 4,161,633 of Robert Trieber, assigned to the assignee of the present invention. Referring now to FIG. 8, a subscriber line circuit 300 for providing an interface between a two-wire analog line 302 and a digital system such as a digital switching matrix is illustrated generally. A telephone subscriber y communicates with another telephone subscriber x by coupling analog signals representative of speech over the two-wire line 302 in the forward direction, indicated by the arrow (which for simplicity of description is shown as a single comunications path as are all of the other communications paths in FIG. 8) to the line circuit 300, which has therein an analog to digital coder 310 which converts these analog signals which are coupled out of the line circuit by line 304 to a switching matrix (not shown). After switching by the switching matrix, these digital signals are coupled to another telephone subscriber line circuit, which is of the same configuration as the illustrated line circuit 300. Digitally coded return communications from such other telephone subscriber line circuit, after switching by the digital switching matrix, are coupled to line circuit 300 on the digital return line 306, (with the return direction from the other subscriber line circuit being indicated by the arrow adjacent x). This digital return signal is converted to an analog return signal by a digital to analog decoder circuit 308 in line circuit 300 and after filtering by analog filter 320 is coupled to subscriber y over the two wire analog line 302 to enable two way communication between subscribers x and y. The two-wire analog line 302 is converted in the line circuit 300 into a four-wire line to split the two directions of communication into separate forward and return two-wire paths. This is required as is well known in the art so that the communication signals in the forward and return directions can be operated upon by and can be compatible with unidirectional devices such as analog-to-digital coders and digital-to-analog decoders. The two-to-four wire conversion is implemented by microcomputer 314, which serves to compensate for imperfect line matching impedance at summing impedance 312 by eliminating reflected signals therein by a digital subtraction technique implemented by digital filters 316 and 318 to continuously subtract the return signal from the sum of the forward and return signals at summation circuit 316 to eliminate undesired reflection signals. The digital switching network is preferably a distributed control digital switching network, preferably of the type described by U.S. Pat. No. 4,201,891 of Alan Lawrence, et al, issued May 6, 1980, also assigned to the assignee of the present application.

Digital PCM speech from the subscriber lines is time division multiplexed on transmission links 16 and 18, each having 32 channels and providing non-blocking access to terminal interface 12 for 60 terminals. Another pair of 32-channel transmission links 20 and 22 provided 32 channels, each on TDM lines from interface 12 to digital switch 14. For details of the interconnection of lines 20 and 22 to switch 14, reference may be made to the aforementioned U.S. Pat. No. 4,201,891. The terminal interface 12 has an interface with microcomputer 24.

Low data speed and high data speed interfaces are used in the system to interface the termination circuits 10 and the terminal interface circuitry 12 to the microprocessor. These are provided by transmission lines 29 (high speed) and lines 28 (low speed). The low speed interface is utilized by microprocessor 24, preferably an Intel 8086μP, to control, for example, analog lines or other terminals.

Line 28 may comprise a thirteen-wire bus with address and data multiplexed over the same set of wires.

The high speed interface controls the operation of terminal interface 12 and any associated high speed peripherals, and also provides a path between the microprocessor 24 and memory 26. This interface uses separate wires for data and addressing with the data path being 16-bits wide.

Figure 2:
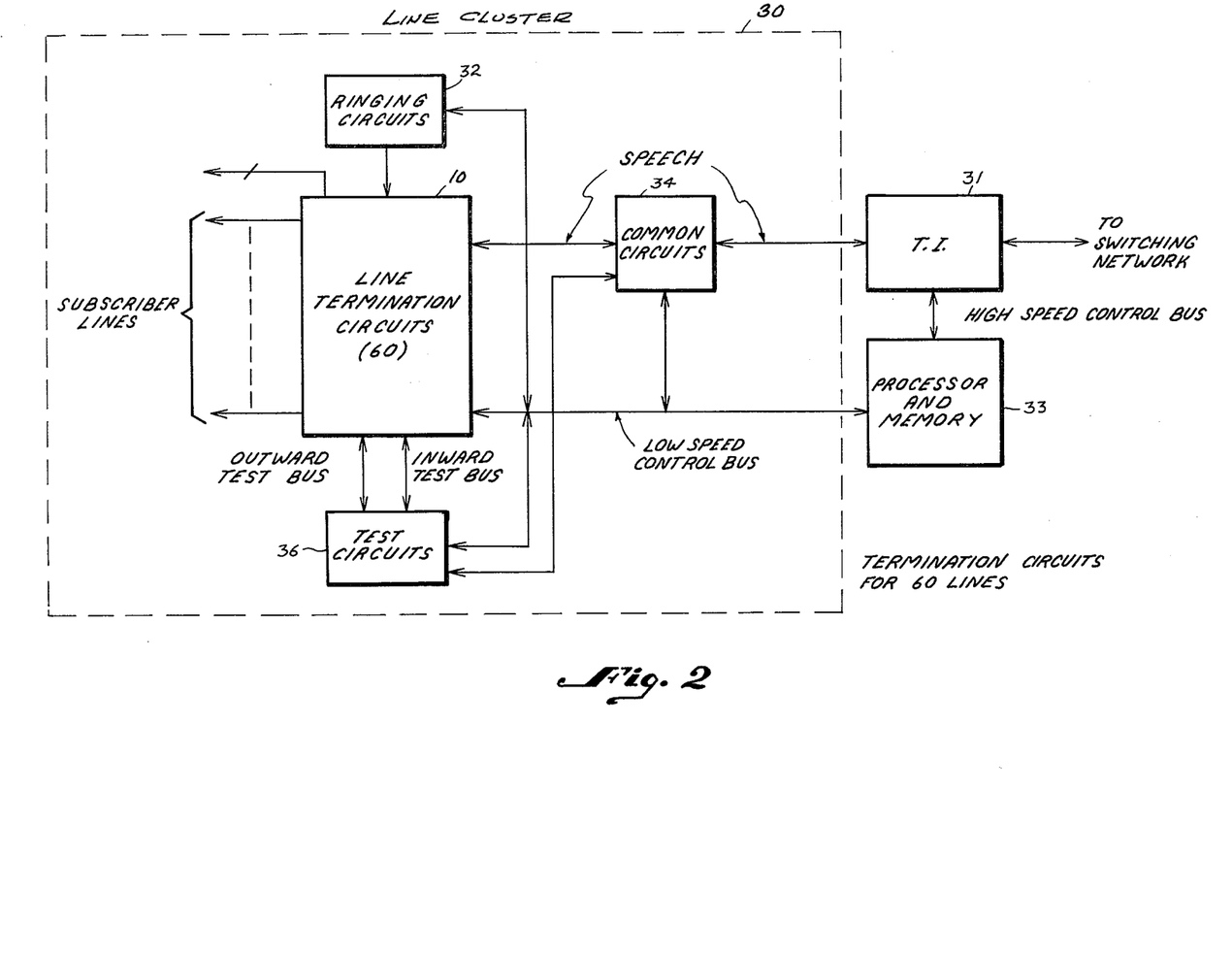
FIG. 2 is a block diagram of a subscriber's line cluster incorporating shared ringing source functions.

FIG. 2 illustrates a block diagram of a 60 subscriber line cluster arranged modularly to provide line termination functions, ringing functions, other common line functions, terminal interface functions and access to the microprocessor. While the present invention relates to the autonomous ringing function in each analog subscriber module and to the architecture of such module, a description of the digital and modular system within which the present invention is advantageously adapted is useful to a complete understanding of the invention. A security block of line terminations comprises 60 line termination circuits (for example). Eight such clusters 30 of 60 line termination circuits constitute one terminal subunit (TSU) (480 subscriber lines). One of line termination circuits 10 per terminal subunit (eight clusters) is reserved as a spare to be used in the event of failure of any other line termination circuit as a substitute therefore. Each cluster of 60 line termination circuits includes two ringing circuits 32, each of which ringing circuits serves thirty lines. Other functions, not comprising a part of the present invention, are provided by common circuits 34 providing common line signaling functions; and test circuits 36 providing test access functions for all lines. Terminal interface 31 corresponds to terminal interface 12 of FIG. 1 and processor and memory 33 of FIG. 2 corresponds to the combined processor 24 and memory 26 of FIG. 1.

Figure 3:
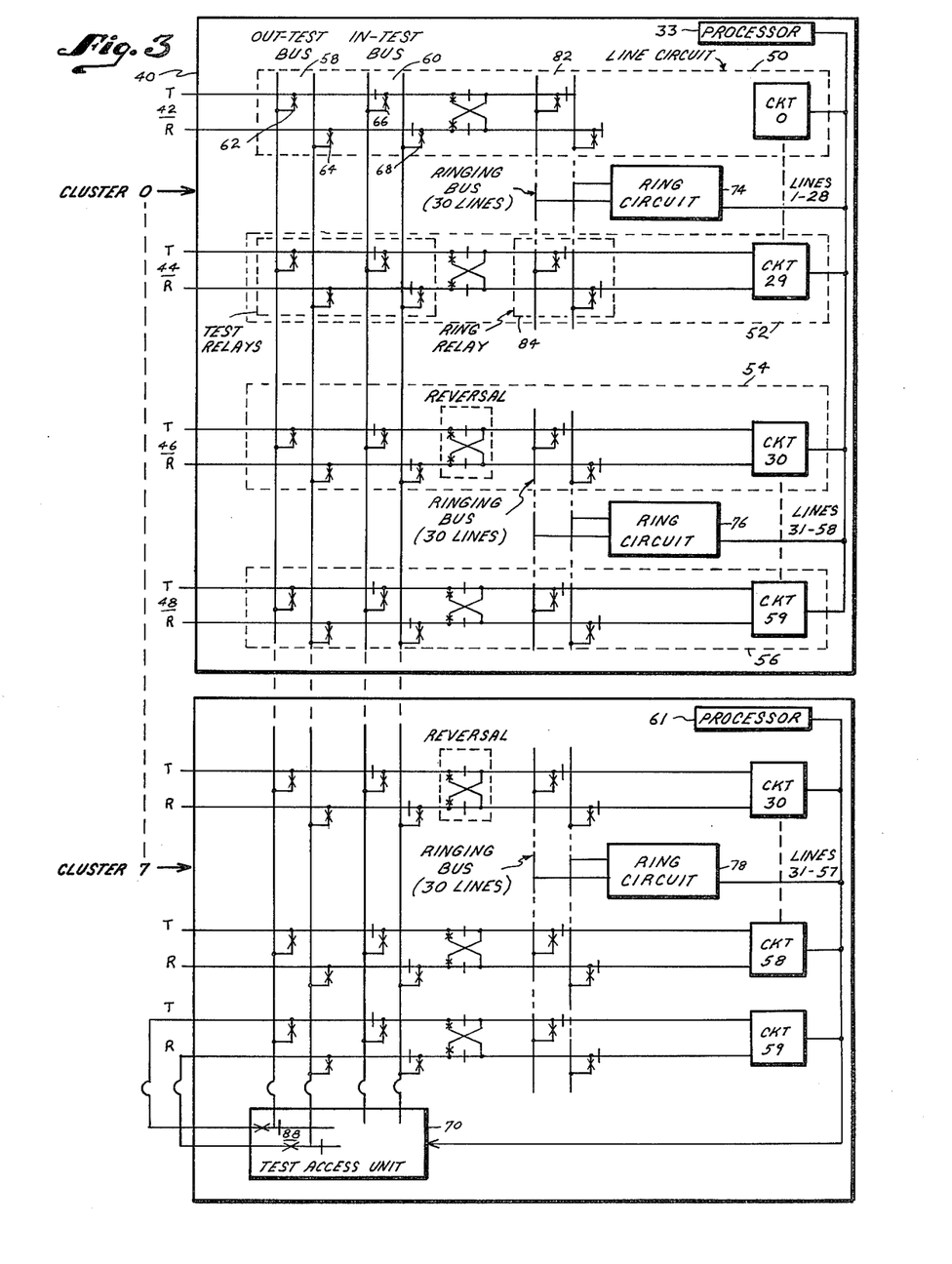
FIG. 3 is a diagram illustrative of the analog interface architecture between subscriber line circuitry and subscriber line/trunks in accordance with the present invention.

Referring now to FIG. 3, the analog interface architecture of a terminal system unit is illustrated. Each TSU includes eight clusters of 60 lines each shown as clusters 0 thru 7. Cluster 0 at 40, has coupled thereto 60 telephone subscriber tip and ring lines, four of which are representatively shown at 42, 44, 46 and 48. Line circuits 50 52, 54 and 56 provide wire connection individually and independently to two test buses 58 and 60 under the control of two relays. By way of example, subscriber line 42 in cluster 0 is coupled to out-test bus 58 via relay connections 62 and 64 and to in-test bus 60 via relay connections 66 and 68. In like manner, metallic access to test buses 58 and 60 is provided for subscriber lines 46 and 48 in cluster 0 and for the subscriber lines in clusters 1 thru 7 by like relays. The operation of the relays 62 thru 68 splits subscriber loop 42 into two parts, completely isolating the external subscriber line from the portion of the subscriber loop within the exchange, while terminating each part of line 42 to the test buses 58 and 60. The out-test bus 58 and the in-test bus 60 each are terminated in a test access unit 70, which typically in a telephone exchange includes equipment to enable an addition to the test function, the test buses to be used for fault recovery and isolation, such as in a power cross condition. A circuit is also included within the test access unit 70 to permit a spare line circuit to replace any faulty line circuit within a TSU to provide temporary service to that subscriber line until the faulty line circuit can be repaired. The foregoing feature is essential in unattended local exchanges. Each ring circuit, such as ring circuits 74, 76, 78, is shared by a group of 30 lines interconnected via a ring bus 82 with access to each ring circuit being under the control of a ring relay circuit 84 included within each line circuit 50. Ring circuit 74 is under program control of the microprocessor as is the ring relay in the line circuit. The software in the microprocessor also determines the cadence, ringing, configuration, frequency, and dc bias. Ring circuit 74 also includes loop supervision circuitry to detect ring-trip condition and to check for loop continuity during ringing.

In accordance with the present invention, one line within a group of 480 lines (eight per cluster) is reserved as a spare line. Of course, the group size is variable depending upon system requirements. In the event that a line within the 480-line group is faulty, as detected by the exchange maintenance system software within the processor or other detection means which may be included within the test access unit 70, the spare line is switched to the affected subscriber line in place of the faulty line; thus providing service until maintenance repair can be accomplished.

The mechanics for an exemplary case of spare line substitution are as follows:
 (a) System maintenance hardware or software in the processor identifies the faulty line, for example, line 50 in cluster 7.
 (b) Relays equivalent to 62, 64, 66 and 68 in the line circuit of line 50 are operated from the corresponding processor in the line circuit, whereby the faulty member subscriber loop is split into two segments, one of which segments faces toward the subscriber loop and is connected to the out-test bus 58 and the other segment being connected to the in-test bus 60 facing toward the digital switching network.
 (c) Relay 88 in the test access unit 70 is actuated.
 (d) The above operations of the relays connect the subscriber affected to the spare line 59 in cluster 7.

Figure 4:
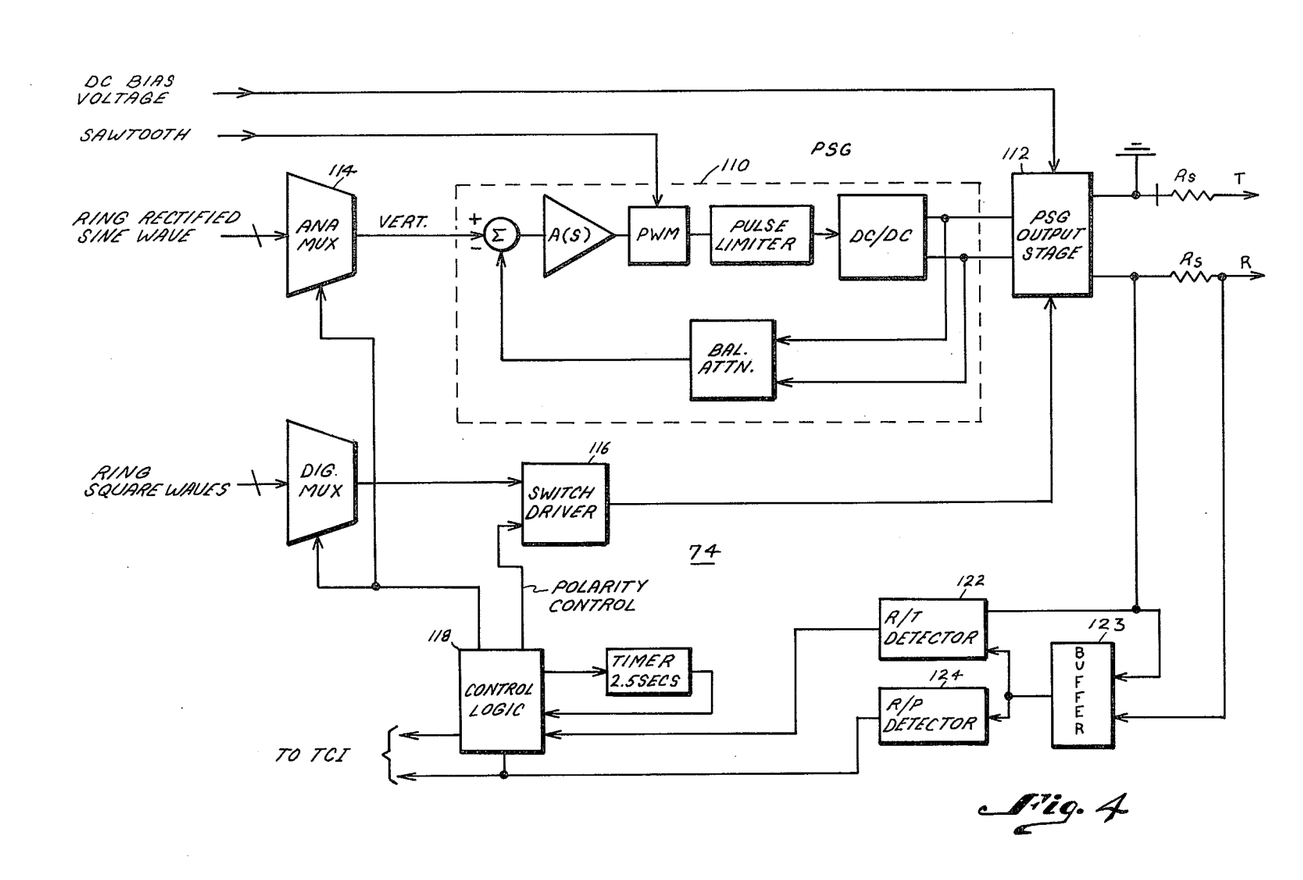
FIG. 4 illustrates generally a block diagram of a ringing circuit in accordance with the present invention.

The ring relay operation is accomplished with dry-switching being defined as opening or closing the relay contacts when the current flowing through the contacts is zero. In conventional telephone system operation, ring relay contacts are opened or closed whether or not current is flowing in the contacts. This prior art operation requires heavier contacts to handle the arcing produced due to abrupt interruption of current which is also more expensive. Also, the subscriber loop circuit is highly inductive; hence, current interruption produces a high voltage spike, which tends to produce arcing between a conductor and Printed Circuit Board and causes noise interference on adjacent circuits. By sensing the zero current point across the current sensing resistor RS, which is coupled to buffer 123 within the ring supervision circuit, an appropriate control signal is generated within the control logic 118 in conjunction with the processor with which it is associated so that ring relay operation is initiated only at zero current flow through the relay contacts.

Figure 5:
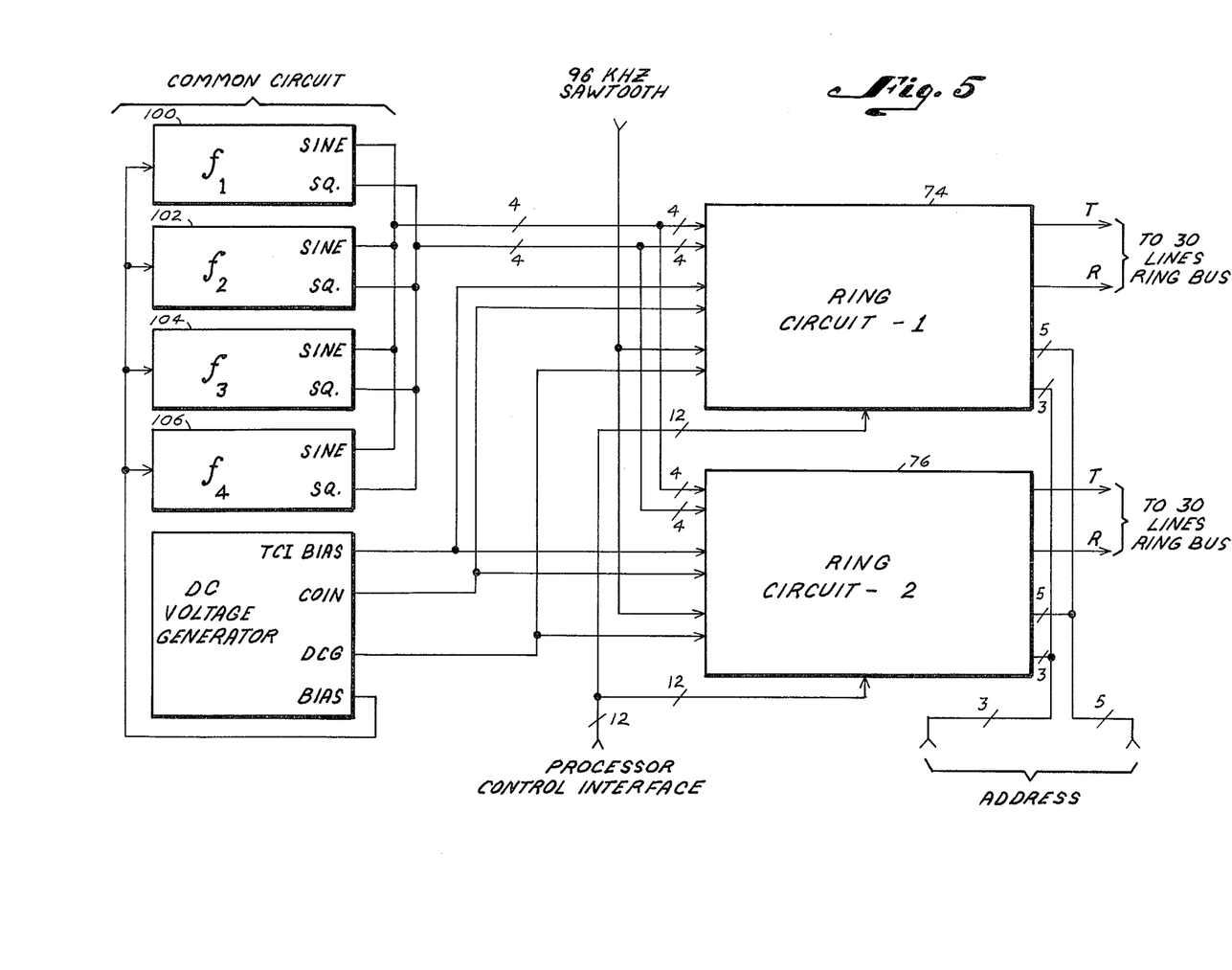
FIG. 5 illustrates a ring circuit arrangement in accordance with the present invention.

Two ring circuits of FIG. 4, in cooperation with the ring relay of line circuit and software control in the microprocessor, comprise a ringing subsystem. The actual programming, being a design choice, does not constitute a part of the present invention; however, it is sufficient for an understanding of the invention that the actual ringing characteristics, i.e. ring duration, etc. are variable in accordance with the control signal from any such microprocessor or programmably controlled input to the ring circuit. Organizationally, FIG. 5 illustrates a microprocessor control signal input to a pair of ring circuits, each serving 60 lines over the common ring bus. A plurality of low level signals of various ringing frequencies at 100, 102, 104 and 106 are coupled to ring circuits, such as ring circuits 74 and 76. The ring circuits function as high voltage power amplifiers which amplify the low level signals, i.e. sine or square waves, for example, from the signal sources 100–106, while providing the requisite power and voltage to drive the subscriber lines.

As will be described, the ring circuit is energized and de-energized in synchronism with the operation of the line circuit ring relays to supply ringing signals at a desired cadence and frequency and to allow dry-switched operation of ring-relay in the line circuit. The ringing signal can be supplied across the tip and ring lines (bridged); from either tip or ring to ground (divided) or symmetrically to the tip and ring lines (balanced). The ring circuit detects subscriber Off-Hook condition during the ring interval in a ring cycle and removes (de-energizes) the ring signal in a specified time duration (ring/trip delay). An Off-Hook signal is transmitted to a system control. A ring present detector circuit detects current flow in the subscriber line, permitting continuity verification of the subscriber loop. The common circuits 34 (FIG. 2) perform multiplexing and demultiplexing of speech data and timing among other functions.

Referring to FIG. 4, the ring circuit 74 is illustrated block diagrammatically. Reference may be made to the aforementioned copending patent application Ser. No. 135,755 entitled Programmable Ring Signal Generator (PSG). A programmable signal generator (PSG) 110 generates a ringing signal under microprocessor control, as described in the aforementioned patent to R. Treiber. The generated ringing signal is coupled to the tip and ring lines from the PSG output stage 112. Ringing reference signals from the ring signal sources are coupled to analog multiplex 114 and then to the programmable signal generator output stage. Square wave signals synchronized with ringing reference signals are also coupled to the programmable signal generator output stage 112 via switch driver 116, which is also controlled by a logic signal from control logic 118. A conventional ring trip detector 122 and ring present detector 124 are provided as aforementioned to provide the control logic 118 and termination control interface (not shown) with ringing information.

For details of the ring circuit 74, reference is made to cross-referenced application Ser. No. 135,755, filed on even date herewith.

Figure 6A:
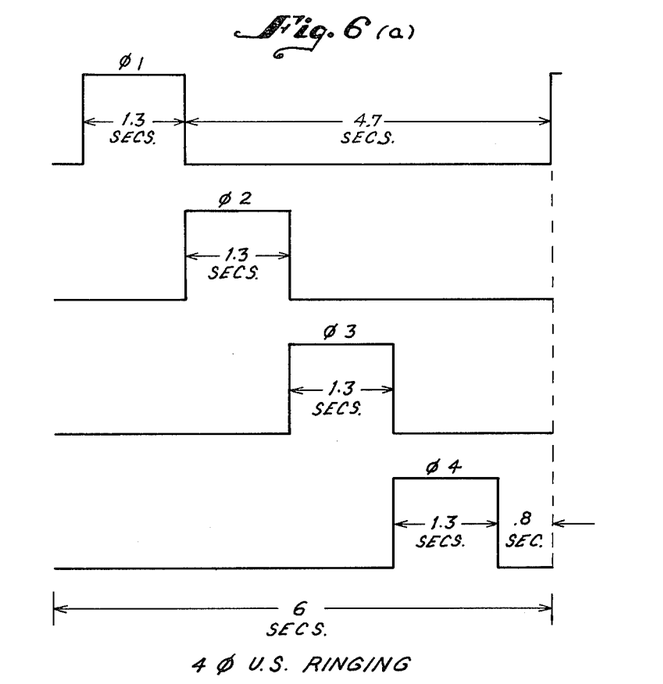
FIGS. 6(a) thru 6(c) illustrate various waveforms useful in describing the ringing operation of the present invention.
Figure 6B:
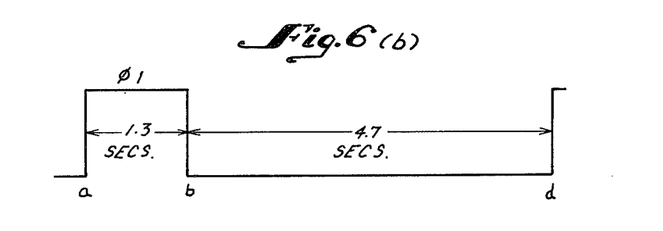

A phasing system is shown in FIG. 5 as an example for providing 4-phase ringing for up to four parties with bridged 20 Hz, 30 Hz, 40 Hz, and 50 Hz tuned ringers. If a ring circuit served 15 lines, for example, had four phases and a ring cadence of 1.3 seconds ON and 4.7 seconds OFF, the following analysis is applicable with reference to FIG. 5. Since each ring circuit serves 15 lines, there are 4 servers/15 lines. Assuming a terminating traffic of 0.05 Erlang/line, a 100 second call holding time and 20 second ringing time, the busy hour ringing traffic is 0.15 Erlang. With four servers, blocking probability is less than 0.001. A busy hour ringing traffic of 0.15 Erlang corresponds to a probability of 0.15 in busy hour that at least one ringing phase is busy, i.e. 0.85 that none of the ringing phase is busy. Thus, immediate ringing probability is 0.85, that is, at least 85 percent of calls will get immediate ringing. Assuming an off busy hour traffic equal to one third that of busy hour, the immediate ringing probability calculation is 0.95, i.e. 95 percent of calls would get immediate ringing. With reference to FIG. 6(b), it has been determined that even under peak ringing traffic conditions, the probability of 1 line out of 15 being rung is approximately 0.225; hence, only 22.5 percent of arriving calls will find only one phase occupied. With a 6-second ringing cycle and random call arrival, a probability of 0.78 can be calculated that arriving calls will arrive in the time frame between (b) and (d) and thus get immediate ringing.

Figure 6C:
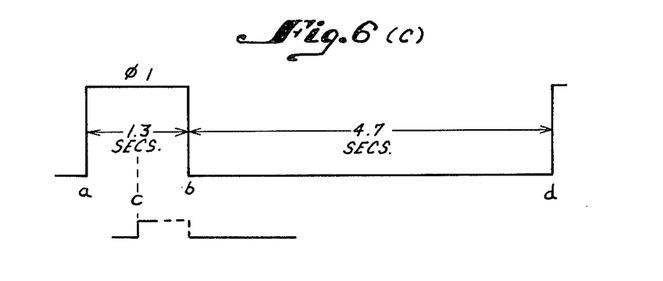

A short ringing burst of about 300 milliseconds within the period bd is initiated upon call arrival, after which time a regular ringing phase is assigned to the call in the next ringing cycle. Thus, the percentage of calls which will get immediate ringing even in peak traffic conditions is approximately 87.5 percent; and in normal busy hour traffic conditions, this probability increase to approximately 96 percent of arriving calls. However, 5 percent of the calls arrive when there is already at least one ringing phase occupied. This situation is illustrated in FIG. 6(c), wherein a ringing request is illustrated at point c when a line is already being rung. If the time period cb is less than or equal to 300 milliseconds, a second line is connected in the same phase, providing immediate ringing. If the ring trip circuit indicates a ring trip during the point cb, then ringing is withdrawn from the lines. After the ring trip, the switch hook detectors of both lines are monitored and the line showing an Off-Hook condition is taken out of the ringing list. The other line from then on is given the same ringing phase. If there is no ring-trip condition during the time cb, the second line is then assigned an empty phase in the next ringing cycle and the next ringing line remains in its previous phase. If cb is less than 300 milliseconds, and there is no ring trip for this period, the second line can be disconnected from the ring bus after 300 milliseconds. From FIG. 6(c), it is apparent that maximum ringing delay will be approximately 300 milliseconds after selection has taken place.

A further embodiment intended to make ringing completely non-blocking and immediate is as follows: With reference to FIG. 6(b), if cb is less than or equal to 100 milliseconds, the phase can be skipped and the line connected to the next phase. Thus, immediate ringing delay can be reduced to 100 milliseconds. Since cb is less than or equal to 100 milliseconds, the initial ring burst starts in one phase and continues to the other phase. This is easily done by leaving the line relay connected but disconnecting the ring relay in the ring circuit. Since the next phase might be already taken by another line before the ring relay is re-connected, the line relay for the other line has to be activated. Blocking due to lack of ring phases may be eliminated by connecting multiple lines to the same phase and in case of a ring trip, all of the lines connected to the same phase are disconnected from the ring circuit and then the switch hook detectors are scanned to determine which line actually went off hook. The off-hook line is then taken off the ringing list for that phase, while the other lines are put back to the list and that phase re-started.

Figure 7:
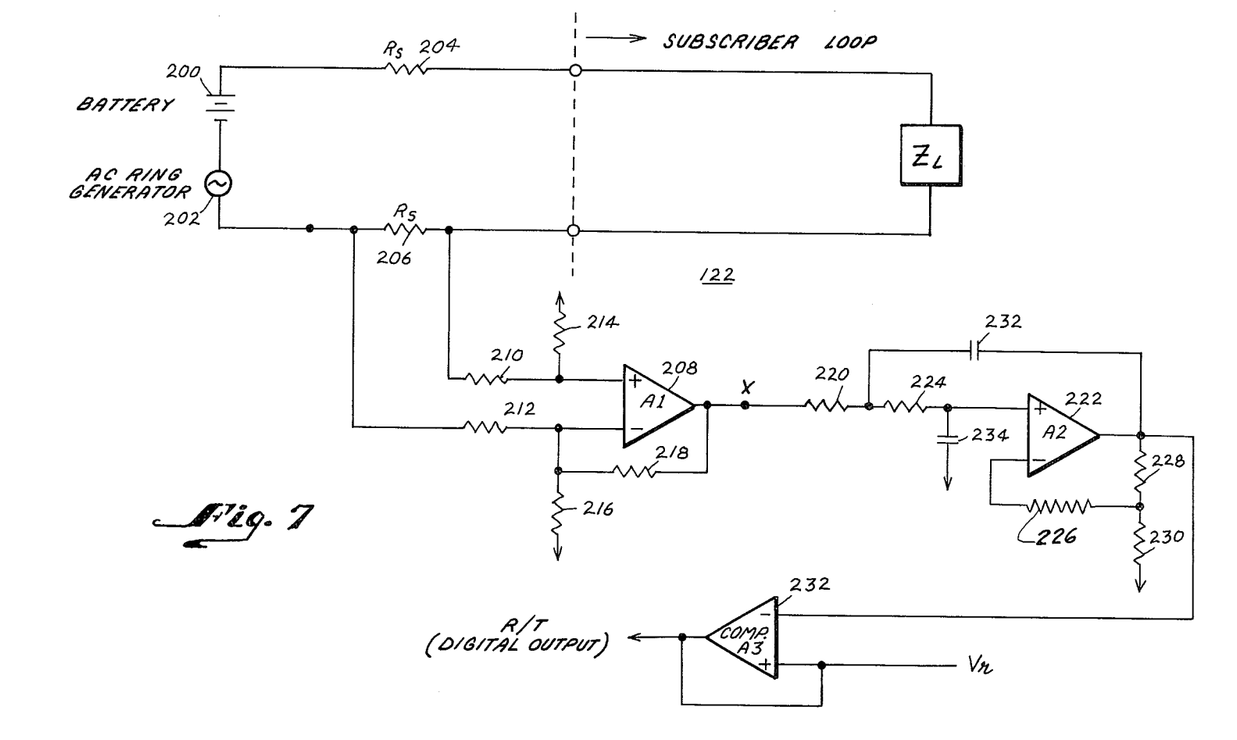
FIG. 7 illustrates a ring-trip circuit which may be utilized in conjunction with the present invention.

Referring now to FIG. 7, a ring-trip circuit 122, which may be utilized in accordance with the present invention, is illustrated. The subscriber loop having a loop impedance ZL is comprised by battery 200, ring generator 202, feed resistors or their equivalent 204 and 206; and of course, ZL. Resistors 204 and 206 are utilized for sensing ring current flowing in the subscriber loop. An operational amplifier 208 taken together with biasing resistors 210, 212, 214, 216, 218 and 220, comprises a buffer amplifier which conditions the ac ringing current signal and dc loop current signal at point X to be processed. Typically, this signal is an ac voltage riding on a dc level which could be 200 volts peak to peak. Operational amplifier 222 and surrounding bias resistors 220, 224, 226, 228 and 230; and capacitors 232 and 234 comprise an act of low-pass filter which serves to filter out the ac ringing current and amplifies the dc signal. Amplifier 232 is a comparator which comprises the dc signal output from amplifier 222 with a reference signal VR. The output from comparator 232 is a loop status signal indicative of either an On-Hook or Off-Hook condition of the line and which comparator output is used to control the ring generator and the system as a whole as to the status of the subscriber loop.

While the present invention has been described in connection with preferred embodiments thereof, it is to be understood that additional embodiments, modifications and applications which will become obvious to those skilled in the art are included within the spirit and scope of the invention as set forth by the claims appended hereto.

We claim:

1. A telephone signaling system comprising:
   means for providing line termination for a plurality of analog telephone subscriber lines or trunks carrying bidirectional analog communication signals, said means including multiplex means for digitally multiplexing analog information from said analog lines or trunks into multi-channel frames of time division multiplexed data on digital transmission links;
   digital signal processing means for deriving ringing control signals;
   a source of ringing signals including a plurality of different frequency generators, selected in accordance with said ringing control signals for application to one or more of said plurality of subscriber lines to provide multifrequency ringing, said ringing signals having an active and a silent period during each ringing cycle;
   shared ring-trip circuit means coupled to said line termination means for sensing an OFF-HOOK condition during the active period of the ringing interval providing shared ringing for a plurality of said lines or trunks and that plural lines or trunks can be rung simultaneously during the active period of a ringing cycle by coupling said selected ringing signals to said analog lines or trunks in response to said ringing control signals; and
   logic means responsive to said control signals for enabling said ringing signals to be coupled from said source of ringing signals to selected ones of said plurality of subscriber lines or trunks to provide immediate ringing to said selected lines or trunks.

2. A telephone signaling system in accordance with claim 1 wherein said means for providing line termination for said plurality of analog lines or trunks includes a two-to-four wire conversion means for each of said analog lines, analog-to-digital conversion means for deriving digitized speech output signals from said analog signals, and digital-to-analog conversion means for deriving analog communication signals from digitized speech signals.

3. A telephone signaling system in accordance with claim 2 wherein said digital signal processing means includes means for sensing transmission line conditions and for generating said control signals in response to said sensed transmission line conditions.

4. A telephone signaling system in accordance with claim 2 wherein said digital signal processing means includes means for generating programmably regulated analog voltages, means for comparing said regulated voltages to a reference voltage, and means for deriving said control signals in response to said comparing.

5. A telephone signaling system in accordance with claim 3 further comprising means for deriving line test signals and means for selectively coupling said line test signals to one or more of said analog lines or trunks in response to control signals provided by said digital signal processing means.

6. A telephone signaling system in accordance with claim 5 wherein said means for coupling said line test signals to said analog lines or trunks couples an out-test bus and an intest bus, each of said buses being coupled to each of said analog lines by a relay means associated with line termination means for its respective analog line or trunk.

7. A telephone signaling system in accordance with claim 2 wherein said shared ring trip circuit means includes ringing bus means coupled to said means for providing line termination of said analog telephone subscriber lines or trunks.

8. A telephone signaling system in accordance with claim 7 further comprising ring relay means associated with each line termination means for coupling ringing signals from said ringing bus means selectively to one or more designated analog lines in accordance with said control signals.

9. A telephone signaling system in accordance with claim 1 wherein said logic means includes means for providing phased ringing on a plurality of lines or trunks.

10. A telephone signaling system in accordance with claim 1 wherein said line termination means further includes:
    ring relay means actuated by said shared ring-trip circuit means for providing a metallic path for said ringing signals from said source of ringing signals to said subscriber lines or trunks;
    and
    means associated with said logic means and responsive to said control signals for dry-switching said ring relay means when ringing is initiated or terminated.

11. A telephone signaling system comprising:
    means for providing n+1 line terminations for a plurality n of analog telephone subscriber lines or trunks carrying bidirectional analog communication signals, such that one of said means is reserved as a spare line termination;
    said means including multiplex means for digitally multiplexing analog information from said analog lines or trunks into multi-channel frames of time division multiplexed data on digital transmission links;
    digital signal processing means for deriving ringing control signals and common bus connection control signals;
    a source of ringing signals, said ringing signals having an active and a silent period during each ringing cycle; shared ring-trip circuit means coupled to said line termination means for sensing an OFF-HOOK condition during the active period of the ringing cycle for providing shared ringing for a plurality of said lines or trunks by selectively coupling said ringing signals to said analog lines or trunks in response to said ringing control signals;
    logic means responsive to said ringing control signals for enabling said ringing signals to be coupled from said source of ringing signals to said plurality of subscriber lines or trunks to provide immediate ringing to said lines or trunks;
    means for monitoring said line termination means to detect a line failure condition of any of n line termination means associated with said n analog telephone subscriber lines, and for generating an output indicative of said failure condition, said output causing said common bus connection control signals to be generated; and common bus means for selectively connecting one of the n+1 line termination means to an analog subscriber, line or trunk associated with a line termination means detected by said monitoring means as having a line failure condition, in response to said common bus connection control signals for the line termination means detected.

12. A method of providing immediate ringing to a plurality of groups of analog telephone subscriber lines or trunks from a plurality of ringing sources and ring-trip circuits, such that one or more of said ringing sources and one or more of said ring-trip circuits are shared by the lines comprising each group, such that each of said groups of lines or trunks has allocated thereto at least one shared ringing source and one shared ring-trip circuit, consisting of the steps of:

terminating each of said subscriber lines or trunks in each of said groups with an individual line termination circuit, said line termination circuit being intercoupled for each group to a common ringing bus for that group;

providing a source of multi-frequency ringing signals for each of said groups, with said ringing signals having an active and a silent period during each ringing cycle;

providing shared ring-trip circuitry for each group coupled to all of the line termination circuits of said each group and to said source of multi-frequency ringing signals for sensing an OFF-HOOK condition during the active period of the ringing interval and for providing shared ringing such that plural lines or trunks can be rung simultaneously during the active period of a ringing cycle, in response to sensed line or trunk conditions;

selecting said multifrequency ringing signals in accordance with control signals such that said selected ringing signals are then coupled over said common ringing bus to said plurality of lines or trunks of each group; and controlling the selecting of said ringing signals such that said control signals energize and de-energize the ringing signals applied to said plurality of lines or trunks of each group so that each of said lines or trunks is provided with immediate ringing.

13. A method in accordance with claim 12, including the additional steps of:

allocating one of the lines or trunks of each group as a spare line or trunk interconnected by bus means to each other of the lines or trunks of said group; and switching said spare line or trunk including its respective line termination circuit to any failed line or trunk of said group in response to a signal indicative of a failed line or trunk.

14. A method in accordance with claim 13 wherein each of said groups comprises a security block of lines or trunks.

15. A method in accordance with claim 12 further including the step of controlling the application of ringing signals to said ringing bus, such that said ringing signals are coupled to said lines or trunks at predetermined phases of the ringing cycle.

16. A method in accordance with claim 12 further including the step of providing one or more test buses intercoupled to each of the lines or trunks or each group and responsive to said control signals such that each of said lines or trunks is isolated by said test bus selectively for fault detection.

17. A method in accordance with claim 15 further including the step of controlling the application of ringing signals to said lines or trunks over said ringing bus such that ringing relays associated with each of said lines or trunks are dry-switched when ringing signal is applied or removed from any of said lines or trunks.

18. A method for providing immediate ringing to a plurality of telecommunication lines or trunks interconnected thru a digital switching network comprising the steps of:

terminating each of said lines or trunks with an interface means including analog-to-digital and digital-to-analog signal conversion means for converting digitized communication signals to analog voice signals and analog voice signals to digitized communication signals;

interconnecting all of said lines or trunks to a ringing bus via a plurality of ring relays, each of said ring relays being associated with one of said lines or trunks and being responsive to ring-trip control signals;

sensing the status of each line or trunk and deriving a loop status signal in response to said sensing;

monitoring said loop status signal to derive ring-trip signals and ring presence signals in response thereto;

generating a plurality of multi-frequency ringing signals for selective application to said lines or trunks in response to ringing control signals; said ringing signals having an active and a silent period during each ringing cycle and selectively amplifying said multi-frequency ringing signals in response to said ringing control signals and simultaneously coupling one or more of said multi-frequency ringing signals to selected ones of said lines or trunks over said ringing bus such that simultaneous and immediate ringing is provided to selected ones of said plurality of lines or trunks during the active period of a ringing cycle.

19. A method in accordance with claim 18 wherein the selectively amplifying step includes pulse width modulating said ringing signals and amplifying said pulse width modulated ringing signals thru dc to dc conversion means.

20. A method in accordance with claim 18 further including the step of:

programmably generating said control signals from a processor having at least a portion of its processing capacity dedicated to said plurality of lines or trunks.

21. A method in accordance with claim 20 further including the steps of:

generating a digital commutation signal synchronized to the frequency of said multi-frequency ringing signals; and switching a commutation switch with said digital commutation signal for coupling said ringing signals to said telecommunication lines or trunks in selected phases of a ringing cycle to provide substantially immediate ringing to said telecommunication lines or trunks.

* * * * *